United States Patent
Chae et al.

(10) Patent No.: US 7,634,336 B2
(45) Date of Patent: Dec. 15, 2009

(54) LOCALIZATION SYSTEM AND METHOD OF MOBILE ROBOT BASED ON CAMERA AND LANDMARKS

(75) Inventors: Heesung Chae, Daejeon (KR); Won Pil Yu, Ulsan (KR); Jae Young Lee, Daejeon (KR); Young Jo Cho, Gyeonggi-Do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 536 days.

(21) Appl. No.: 11/508,716

(22) Filed: Aug. 23, 2006

(65) Prior Publication Data

US 2007/0150097 A1    Jun. 28, 2007

(30) Foreign Application Priority Data

Dec. 8, 2005   (KR) ............. 10-2005-0119703
May 12, 2006  (KR) ............. 10-2006-0043109

(51) Int. Cl.
*G05D 1/00* (2006.01)
(52) U.S. Cl. ............. 701/28; 701/23; 700/245; 700/259; 702/150; 180/167
(58) Field of Classification Search ........... 700/245, 700/258, 259; 701/23, 28; 702/150, 151; 180/167, 168
See application file for complete search history.

(56) References Cited

U.S. PATENT DOCUMENTS

2004/0167667 A1* 8/2004 Goncalves et al. ......... 700/245
2004/0202351 A1* 10/2004 Park et al. ................. 382/104

FOREIGN PATENT DOCUMENTS

KR   2003-0026496   4/2003

OTHER PUBLICATIONS

E. Brassart, C. Pegard, and M. Mouaddib, "Localization using infrared beacons," Robotica, vol. 18, pp. 153-161, 2000.*
Y. Nagumo and A. Ohya, "Human Following Behavior of an Autonomous Mobile Robot Using Light-Emitting Device," IEEE Int. Workshop on Robot and Human Interaction, pp. 18-21, 2001.*
D. Ferguson, A. Morris, D. Hahnel, C. Baker, Z. Omohundro, C. Reverte, S. Thayer, W. Whittaker, W. Whittaker, W. Burgard, and S. Thrun, "An autonomous robotic system for mapping abandoned mines," In Proc. Conference on Neural Information Processing Systems (NIPS), Cambridge, MA, 2003, pp. 225-230.*

* cited by examiner

*Primary Examiner*—Thomas G Black
*Assistant Examiner*—Peter D Nolan
(74) *Attorney, Agent, or Firm*—Ladas & Parry LLP

(57) ABSTRACT

A localization system and method of a mobile robot using a camera and artificial landmarks in a home and a general office environment (or working zone) is provided. The localization system includes artificial landmarks having an LED flash function in an invisible wavelength band, a camera with a wide-angle lens, a module flashing landmarks attached at the ceiling and identifying positions and IDs of the landmarks from an image photographed by the camera having a filter, a module calculating position and orientation of the robot using two landmarks of the image in a stop state, a module, when a ceiling to which the landmarks are attached has different heights, a position of the robot, and a module, when a new landmark is attached in the working zone, calculating a position of the new landmark on an absolute coordinate.

19 Claims, 6 Drawing Sheets

LOCALIZATION SYSTEM AND METHOD OF MOBILE ROBOT BASED ON CAMERA AND LANDMARKS

BACKGROUND OF THE INVENTION

1. Field of the Invention

The present invention relates to system and method of measuring a self-position of a mobile robot using a camera and artificial landmarks in a home and a general office environment, and more particularly, to localization system and method of a mobile robot based on a camera and artificial landmarks, the artificial landmarks having a wireless LED flash function in an invisible wavelength band, the camera being provided with a wide-angle lens, in which the artificial landmarks are installed at a ceiling of a working zone and the camera built in the mobile robot measures the position of the mobile robot using the landmarks photographed by the camera.

2. Description of the Related Art

A method of implementing an autonomous robot navigation generally includes a localization method that can directly catch the position information of a mobile robot in a moving environment of the mobile robot, a guidance method that generates a moving path in the moving environment from the localization method and controls a robot platform along a corresponding path, and an environment map building method that collects and manages the information on the moving environment of the robot.

The environment map building method can be classified into a metric path generation method which builds a metric map and a topological path generation method which builds a topology map. The metric path generation method indicates methods of selecting a robot path by optimizing a preset performance index with respect to a robot path generated from a robot environment data quantitatively expressed. A representative of the metric path generation method is a case that an environment map in the form of an indoor plane view having a grid structure and an optimal control method considering an optimal path within this environment map or a kinematic structure of a robot platform are selected.

On the other hand, the topological path generation method can build an environment map in the form of a graph expressing characteristic positions within a robot environment, for example, a spatial relationship between respective characteristic points from references such as a furniture, an electronic appliance, or a door entrance and also build a path, for example, "passes the door and moves to a side of a refrigerator" from the built environment map.

As aforementioned, to allow the mobile robot to move along a given path or to built a new path, it is essentially required to collect information on the current position of the mobile robot and to allow the mobile robot to confirm a self-position whenever necessary. For this purpose, artificial landmarks may be installed within the moving environment of the mobile robot or natural landmarks may be extracted from a given environment. Also, an active landmark, such as light or an RF signal may be projected to measure a direction of arrival of a corresponding signal, thereby catching the position of the mobile robot.

Therefore, in recent years, position recognition techniques are being researched, which enable the mobile robot to presume the self-position from the given environment map information and characteristic information of surroundings even through the mobile robot does not conceive the self-position.

An example which uses the artificial landmarks to trace the self-position of the mobile robot is disclosed in Korean Patent Publication No. 2003-0026496 entitled "Artificial Landmark Apparatus for Landmark based Self-Localization of Mobile Robot". This cited reference is to overcome a drawback that when the artificial landmark is recognized using an image processing method, a recognition result is influenced by an environmental luminance, and enables the mobile robot to recognize the landmarks and autonomically navigate even in a low luminance environment or a dark environment by installing an illumination apparatus for a constant luminance around the artificial landmarks.

However, the aforementioned prior art has an inconvenience that a separate illumination apparatus and an illumination control apparatus for controlling the separate illumination apparatus should be installed. Also, the prior art fails to presume a global localization and an azimuth angle within an entire environment of the mobile robot and has a difficulty in presuming the self-position and the azimuth angle according to a change of the illumination.

SUMMARY OF THE INVENTION

Accordingly, the present invention is directed to a localization system and method of a mobile robot based on a camera and landmarks, which substantially obviates one or more problems due to limitations and disadvantages of the related art.

It is an object of the present invention to provide a localization system and method of a mobile robot that can measure information on a self-position and orientation (x, y, θ) of the mobile robot in real time using n number of landmarks and a camera within an indoor zone regardless of a change in illuminance.

It is another object of the present invention to provide a localization system and method of a mobile robot that can perform a localization and orientation measurement of the mobile robot more simply and without any limitation even in a wider and new zone by continuously increasing the number of landmarks.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a localization system of a mobile robot, comprising: n number of landmarks attached at a ceiling and having wireless transmitting and receiving functions, a camera photographing the n number of landmarks; a landmark detection part which flashes the landmarks attached at the ceiling and obtains positions and IDs of the landmarks from an image photographed by the camera to detect at least two landmarks; a robot position detection part calculating the position of the mobile robot using the detected landmarks; a landmark position prediction part which, when a new landmark is attached within a working zone, calculates a position of the new landmark on an absolute coordinate; a topology map building part which builds a topology map of the mobile robot using the calculated position of the new landmark; and a robot controller controlling a navigation of the mobile robot using the built topology map.

Also, the n number of landmarks each have a specific ID built therein, comprises an infrared LED emitting light in a specific wavelength band, and wireless transmitting and receiving modules, and the camera comprises an infrared filter which passes a light with the specific wavelength band to detect the infrared LED of the landmark, and a wireless transmitting and receiving module. The robot position detection part comprises: a first module calculating current position and orientation of the mobile robot using an image of the detected two landmarks when the mobile robot is in a stop state; a second module calculating a position of the mobile robot in real time when the mobile robot is in a moving state; and a third module calculating a position of the mobile robot when the ceiling to which the n number of landmarks are attached has different heights.

Further, the topology map building part builds the topology map by setting the landmarks as nodes and obtaining a distance information between the nodes.

In another aspect of the present invention, there is provided a localization method of a mobile robot using a camera and a landmark, the localization method comprising the steps of: (a) detecting the landmark from an image of the landmark photographed by the camera to calculate a position of a mobile robot; (b) when a new landmark is added to a working zone, obtaining a position of the added landmark using the calculated position of the mobile robot; (c) setting the added landmark as a node to build a topology map; and (d) controlling a navigation of the mobile robot using the built topology map and the calculated position of the mobile robot.

The step (a) may include: (e) acquiring an ID of the landmark using a wireless transmitting and receiving module of the mobile robot, flashing the landmark and photographing an image of the landmark of a ceiling; (f) performing a binary search for the photographed image of the landmark to detect at least two landmarks; and (g) calculating position and orientation of the mobile robot using the detected at least two landmarks.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
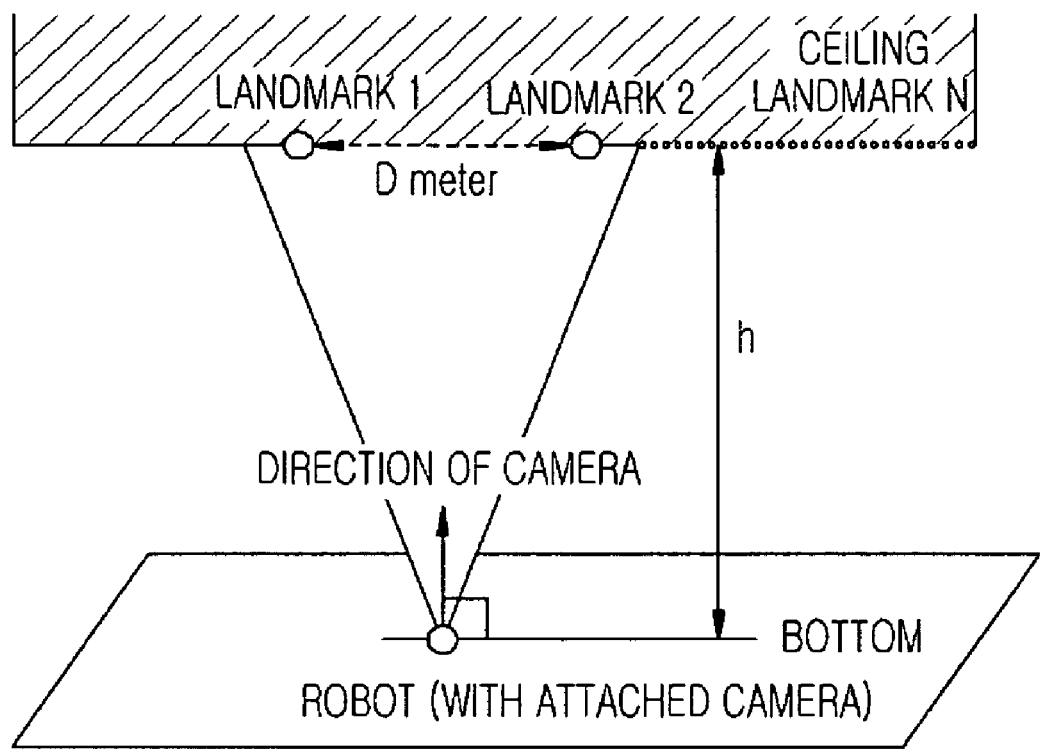
FIG. 1 illustrates a localization system of a mobile robot based on a camera and landmarks according to an embodiment of the present invention.

FIG. 1 illustrates a localization system of a mobile robot based on a camera and landmarks according to an embodiment of the present invention, in which n number of landmarks are installed on a ceiling of a working zone (e.g., general home and office environment) and LED flash of the landmarks are performed until two landmarks are first taken on a camera image by a binary search method.

Figure 2:
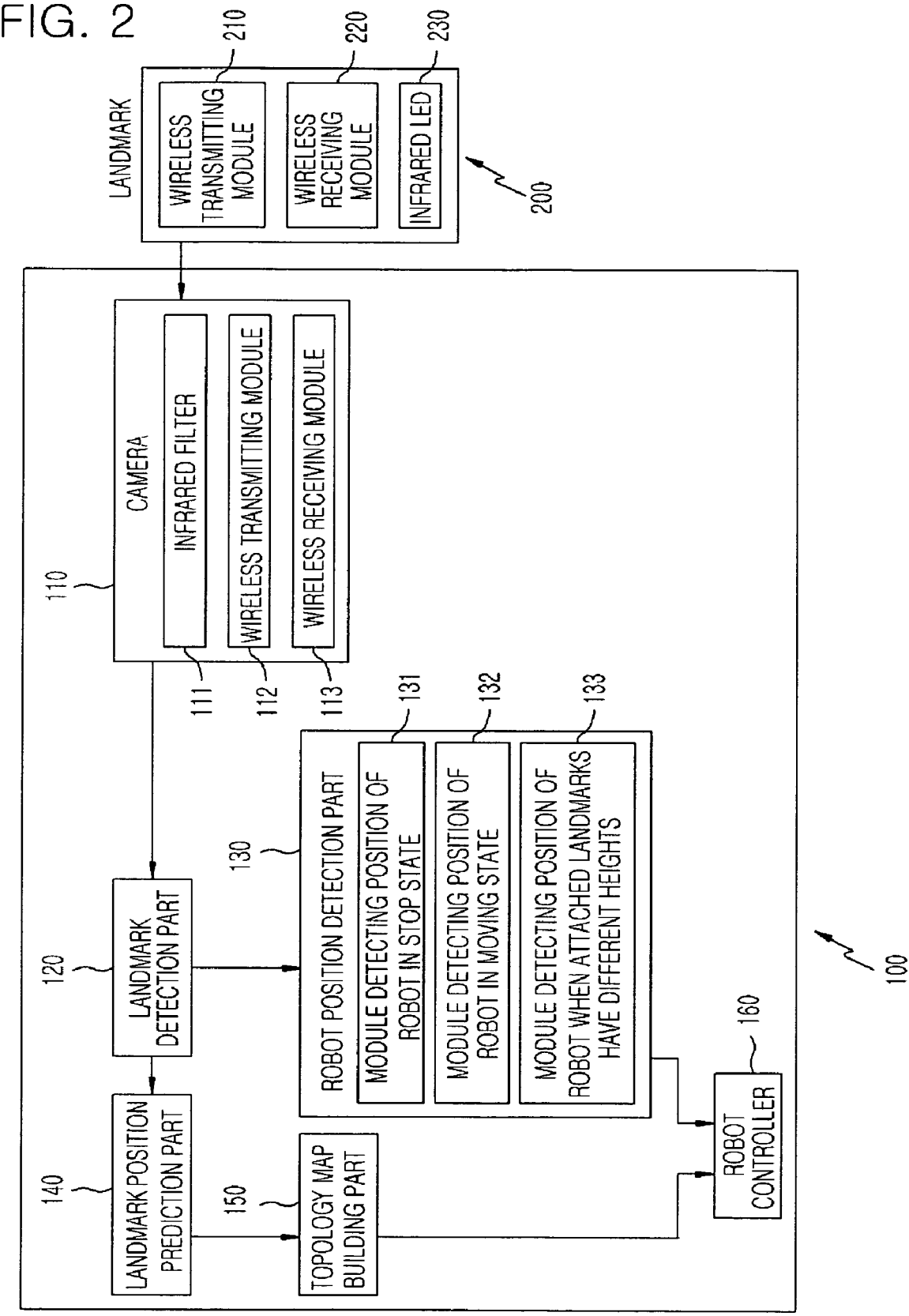
FIG. 2 is a block diagram of the localization system of FIG. 1.

Referring to FIG. 1, the localization system of the present invention is to obtain information on localization and coordinate (x, y, θ) of a mobile robot in an indoor zone using n number of landmarks and a camera. The n number of landmarks are attached at a ceiling of the working zone where the mobile robot moves, and a camera provided with a wireless transceiver is built in an upper side of the mobile robot. The mobile robot flashes LEDs of the landmarks installed at the ceiling, obtains images of the ceiling before and after the LEDs are flashed, compares the obtained images and calculates information on localization and orientation from the positions of the landmarks on an image coordinate obtained by the above comparing, and the positions of the landmarks on a reference (or absolute) coordinate FIG. 2 is a block diagram of the localization system according to an embodiment of the present invention. Referring to FIG. 2, the localization system includes n number of landmarks 200 each having ID and wireless transmitting and receiving function, and a mobile robot 100 provided with a wide-angle camera 110 to which wireless transceiver modules (including infrared communication, RF, Zigbee, or other wireless communication) 112, 113 is attached.

In the localization system of the mobile robot according to an embodiment of the present invention, each of the landmarks 200 has a specific ID built therein, wireless transmitting and receiving modules 210 and 220 which wirelessly communicate with the mobile robot, and an infrared LED 230 which emits a light in a specific wavelength band of an invisible wavelength band. The camera 110 has a wide-angle lens and an infrared filter 111 which selectively passes only the wavelength band of the light emitting from the LEDs of the landmarks. In other words, since the localization system of the present invention can automatically filter a general background picture, it can overcome a drawback of a vision (camera) sensor which is sensitive to the illumination. Also, since the image obtained through the filter is a Gray level image and the background image has a remarkable gray level difference from the LED, it is possible to detect the LED from the image using a proper critical value without performing a special image processing procedure. Since the wide-angle lens is employed in the camera so as to use the landmarks as small as possible, an image distortion according to the characteristic of the camera lens is generated. It is an essential condition to correct the image distortion for an exact position measurement of the mobile robot. However, the present invention does not provide a special distortion compensation technique but corrects the distortion using the conventional method (Flexible Camera Calibration by Viewing a Plane from Unknown Orientations—Zhang, ICCV99).

The localization system of the mobile robot according to the present invention includes n number of landmarks 200 attached at the ceiling and having the wireless transmitting and receiving functions, and a mobile robot 100, the mobile robot 100 including a landmark detection part 120 which flashes the landmarks 200 attached at the ceiling and obtains a position and an ID of the landmark 200 from an image photographed by the camera 110 to detect at least two landmarks 200, and a robot position detection part 130 calculating the position of the mobile robot 100 using the detected landmark, a landmark position prediction part 140 which, when a new landmark is attached, calculates a position of the new landmark on an absolute coordinate, a topology map building part 150 which builds a topology map of the mobile robot using the calculated position of the new landmark, and a robot controller 160 controlling a navigation of the mobile robot using the built topology map.

Figure 6:
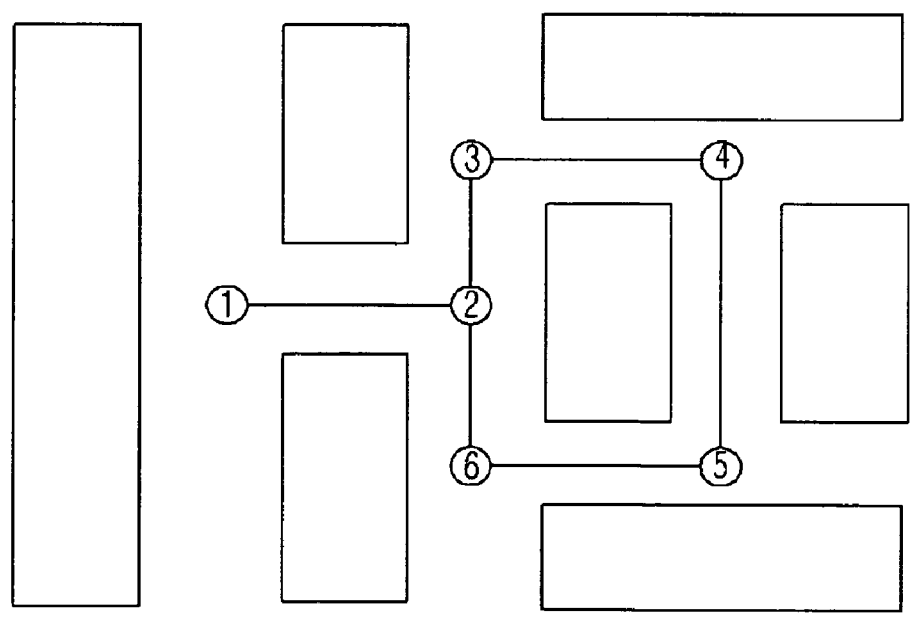
FIG. 6 is a schematic view illustrating that landmarks are installed on a ceiling of a working zone of a mobile robot for the construction of a topology map.

To calculate the position of the mobile robot using the localization system of FIG. 2 in real time, n number of landmarks are installed at the ceiling (e.g., home and office environment) as shown in FIG. 6. To photograph first two landmarks, an operation of flashing the LEDs of the landmarks is performed using the wireless transmitting module 112 of the camera 110 until two landmarks are detected on a camera image by a binary search method.

In detail, the landmark detection part 120 transmits through the wireless transmitting module 112 a command requesting that the LEDs of all the landmarks should be flashed in order to detect the positions of the landmarks attached at the ceiling and IDs. At this time, since the landmark detection part 120 uses the wireless communication, only the landmarks positioned within a constant distance receive the flash command. The landmark detection part 120 detects two landmarks from the image photographed by the binary search with respect to only the landmarks which receives the flash command. The wireless communication used between the mobile robot and the landmarks has a limitation in the transmitting and receiving distance regardless of the types of the wireless communications. For example, the infrared communication has 10 m of transmitting and receiving distance (a deviation may exist depending on the manufacturing methods). To this ends, in the case of the infrared communication module, only the landmarks positioned within 10 m from the transmitting module built in the mobile robot can receive the flash signal transmitted from the mobile robot. In the initial stage, the above method is used to minimize the time taken in searching the desired landmark, and searches the desired landmark using the binary search method with respect to only the landmarks responding within 10 m.

In other words, since the method which repeats on-off with respect to all the landmarks installed at the ceiling and compares the photographed images to search the desired landmark takes much time, the landmark detection part 120 searches the landmarks positioned over the head of the mobile robot, i.e., two landmarks existing on the image photographed by the camera built in the mobile robot among the plurality of landmarks attached at the ceiling, by the binary search method. The binary search method will be described in more detail in the following. First, to acquire IDs of two landmarks existing within the image photographed by the camera, LED ON signal is transmitted to half of all the landmarks attached at the ceiling using the wireless transmitting and receiving function of the camera. The camera extracts the landmarks of which the LEDs are flashed from the half of all the landmarks receiving the LED flash signal. Then, LED flash signal is transmitted to half irregularly selected from the landmarks of which LEDs are flashed and the camera again extracts the landmarks of which the LEDs are flashed from the half of the landmarks receiving the LED flash signal. The above procedure is repeated until only two landmarks finally remain.

Using the positions (image) of the two landmarks acquired by the above work, the robot position detection part 130 calculates the position and orientation of the mobile robot. Herein, with respect to the first two landmarks acquired from n number of landmarks attached at the ceiling of the working zone, a preceding work inputting a real position in advance on a world coordinate is necessary. With respect to the third and more landmarks, a landmark position tracing part provided in the present invention can calculate the position of the landmark on the world coordinate.

Figure 3:
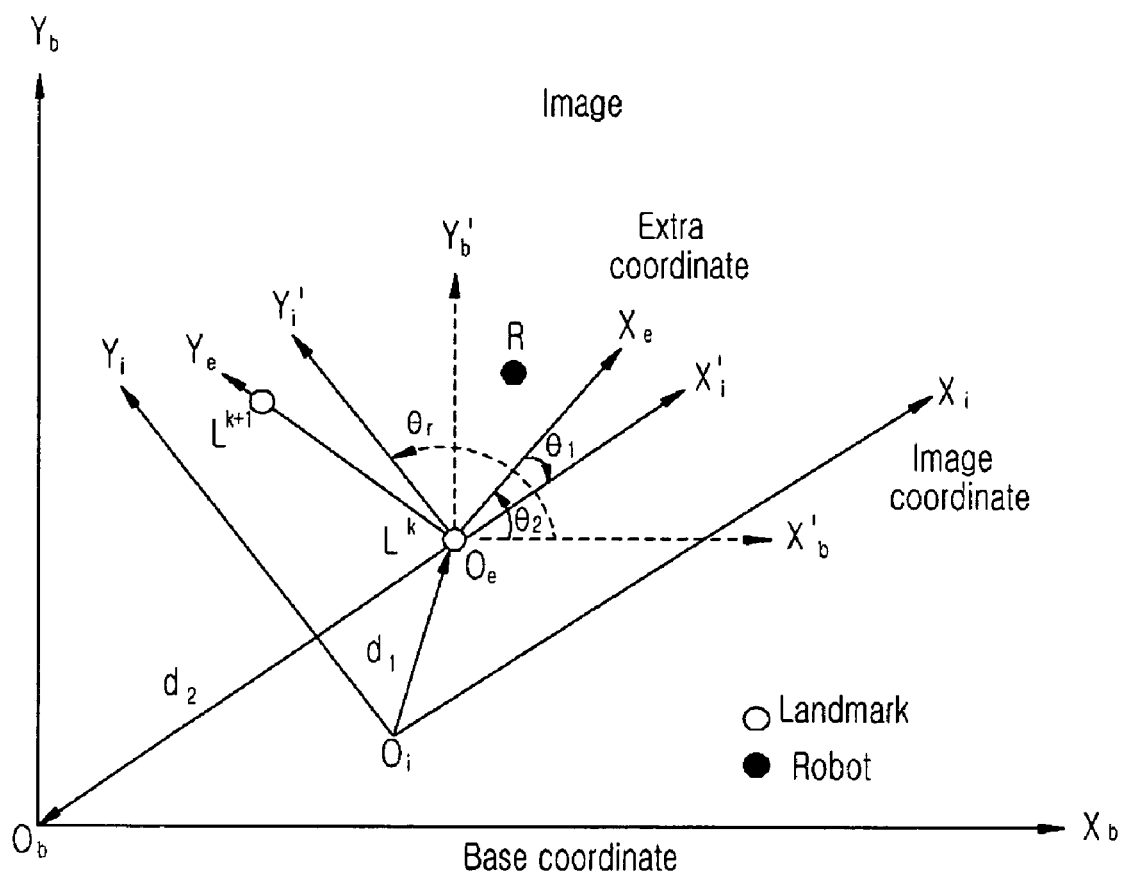
FIG. 3 is a graph illustrating a method of setting a coordinate system necessary for calculating a position of a mobile robot using only two landmarks among n number of landmarks.

The robot position detection part 130 calculates the position and direction of the mobile robot from the following equations 1 through 8 using the world coordinate and the image coordinate expressed in FIG. 3. When the camera is installed at a center of the mobile robot, the position of the mobile robot is the same as a center coordinate of the camera image and the direction of the mobile robot can be expressed as in FIG. 1.

First, a method of setting the world coordinate, the image coordinate and the extra coordinate and a method of expressing the position of the mobile robot on each coordinate are defined. The world coordinate is a coordinate serving as a reference for expressing the positions of all the landmarks and the mobile robot. The image coordinate still uses the coordinate of the camera image. The extra coordinate is set by calculating pixel positions of $L_i^k$, $L_i^{k+1}$ (k=1, ..., n) on an image through an image processing, and setting $L_i^k$, $L_i^{k+1}$ (k=1, ..., n) as an origin and $L_i^k$ as $Y_e$ axis direction.

The following is definitions of expressions of the landmarks and the mobile robot in each coordinate:

$\_P_w$, $L_b^k$, $L_b^{k+1}$ (k=1, ..., n): Expression of mobile robot and landmarks on the world coordinate;

$\_P_i$, $L_i^k$, $L_i^{k+1}$ (k=1, ..., n): Expression of mobile robot and landmarks on the image coordinate; and $\_P_e$, $L_e^k$, $L_e^{k+1}$ (k=1, ..., n): Expression of mobile robot and landmarks on the extra coordinate.

The position of the mobile robot can be calculated using the expression of the landmarks (L) and the mobile robot (P) in each coordinate and using two landmarks in the extra coordinate as follows:

$$P_e = R_{ie} \cdot (P_i - T_{ie}) \tag{1},$$

$$R_{ie} = \begin{bmatrix} \cos(-\theta_1) & -\sin(-\theta_1) \\ \sin(\theta_1) & \cos(\theta_1) \end{bmatrix} = \begin{bmatrix} \cos(\theta_1) & \sin(\theta_1) \\ -\sin(\theta_1) & -\cos(\theta_1) \end{bmatrix}, \tag{2}$$

$$T_{ie} = L_i^k \tag{3}.$$

Also, parameters are defined so as to unify the units of the world coordinate and the image coordinate.

$$S = \frac{\|L_w^1 - L_w^2\|}{\|L_i^1 - L_i^2\|}, \tag{4}$$

$$P_w = R_{we} \cdot s P_e + T_{we} \tag{5},$$

$$R_{we} = \begin{bmatrix} \cos(\theta_2) & -\sin(\theta_2) \\ \sin(\theta_2) & \cos(\theta_2) \end{bmatrix}, \qquad (6)$$

$$T_{we} = L_b{}^k \qquad (7).$$

In the robot position detection part 130, a module 131 of detecting the position of the mobile robot in a stop state calculates a final position of the mobile robot in the stop state using the equations 1 and 5.

The final position $P_w$ of the mobile robot is calculated by the following equation 12 which is obtained by substituting the equation 1 for the $P_e$ of the equation 5:

$$P_w = R_{we} \cdot s(R_{ie} \cdot (P_i - T_{ie})) + T_{we} \qquad (12),$$

where $P_w$ is the position of the mobile robot on the world coordinate that is the calculated final position of the mobile robot, $P_i$ is the position of the mobile robot on the image coordinate, $R_{we}$ is a rotational vector informing how much the extra coordinate rotationally moves with respect to the world (absolute) coordinate, $R_{ie}$ is a rotational vector informing how much the image coordinate rotationally moves with respect to the extra coordinate, $T_{ie}$ is a parallel movement vector informing how much the image coordinate moves in parallel with respect to the extra coordinate, $T_{we}$ is a parallel movement vector informing how much the extra coordinate moves in parallel with respect to the world (absolute) coordinate, and s is a distance ratio between two landmarks on an image and the real two landmarks.

The orientation of the mobile robot is calculated by the following equation 8:

$$\theta_r = \theta_2 - \theta_1 + \frac{\pi}{2}. \qquad (8)$$

The method of calculating the position of the mobile robot from the image obtained by flashing the LED 230 of the landmark is possible in the state that the mobile robot stops. In the state that the mobile robot moves, since the mobile robot already has a motion while the LED 230 is flashed, it is impossible to calculate (e.g., calculate a gray level difference between images before and after the LED is flashed) the position of the landmark from the image using the images after and before the LED is flashed. Accordingly, a module 132 of the robot position detection part 130 for calculating the position of a moving mobile robot in real time in a moving state of the mobile robot as shown in FIG. 4 can obtain the position of the robot as follows.

Figure 5:
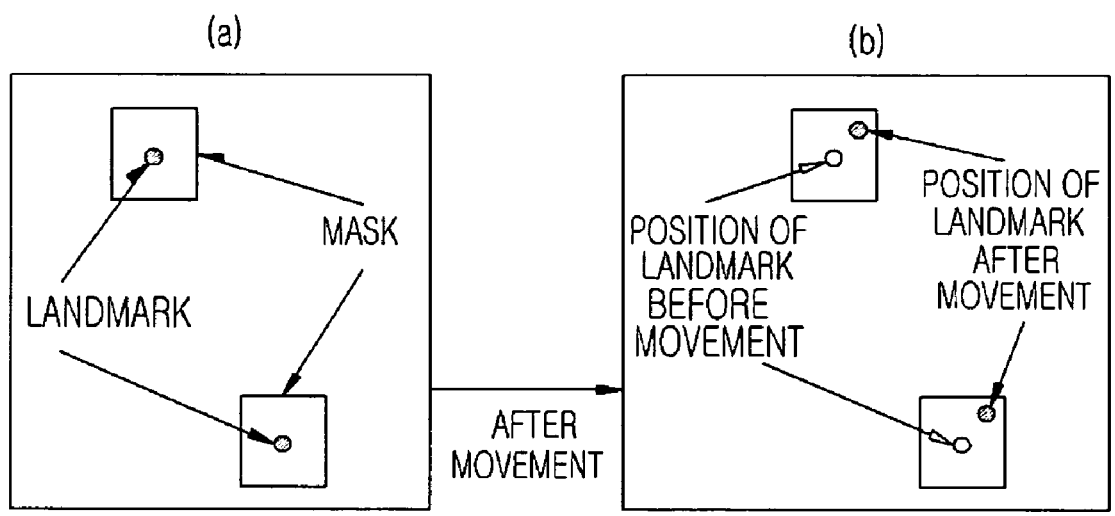
FIGS. 5A and 5B is a schematic view illustrating positions of landmarks before and after a mobile robot moves.

IDs and image coordinates necessary for the localization of the mobile robot are obtained by the landmark detection part 120 as shown in FIG. 5A, and a mask with a predetermined size is set based on the image coordinates of the obtained landmarks. The LEDs of all the landmarks are flashed, and after the mobile robot moves as shown in FIG. 5B, the image coordinates of the landmarks are calculated at the module 132 of the robot position detection part 130 calculating the position of the mobile robot in real time by a method of searching only the set mask. As the mobile robot moves, this work is repeated.

Figure 4:
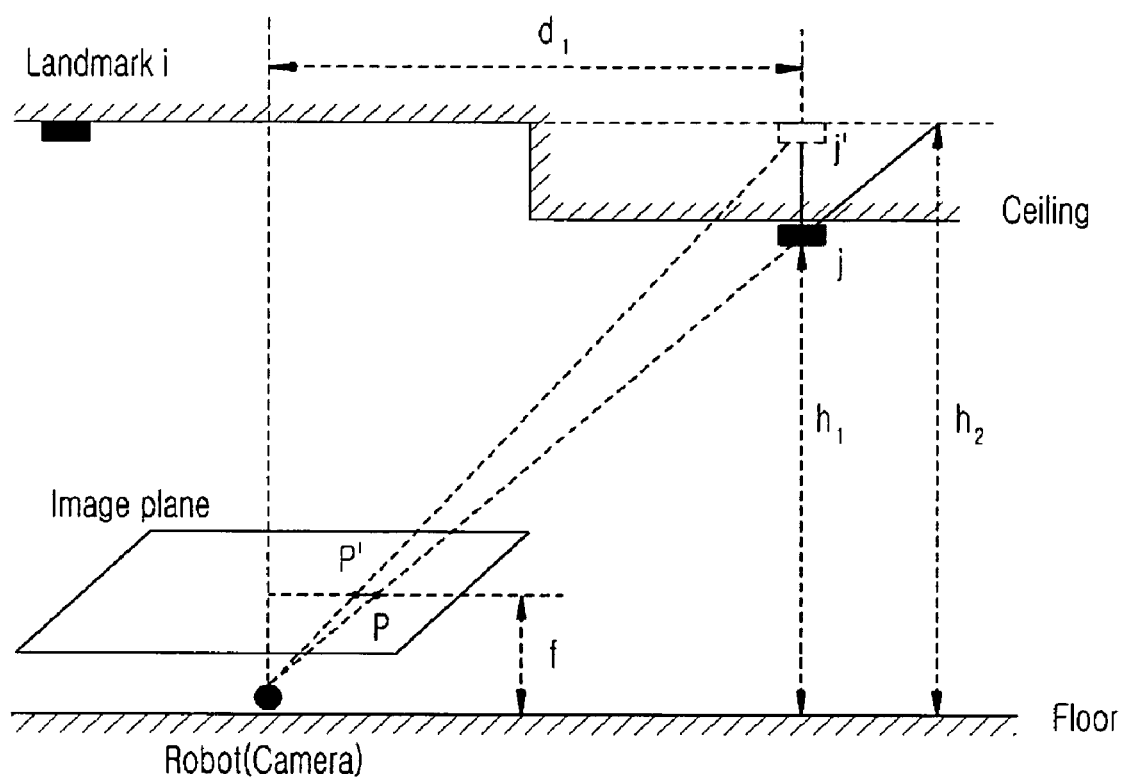
FIG. 4 are views illustrating a method of correcting a camera image coordinate of a landmark when ceilings of working zones are different in height.

In addition, when landmarks are installed on a ceiling having different heights as shown in FIG. 4 a module 133 of the robot position detection part 130, which when a ceiling has different heights, calculates the position of the mobile robot, should correct the image coordinates of the landmarks so as to calculate the position of the mobile robot.

In the present invention, the image coordinate is corrected as follows:

$$f : P' = h_2 : d_1$$

$$P'(u_j v_j) = \frac{f \cdot d_1}{h_2} \qquad (9)$$

where a focal distance f of the camera and heights $h_1$, $h_2$ of the ceiling are fixed values. However, since a distance d1 between the mobile robot and the landmark is changed depending on the position of the mobile robot, it is obtained by the below equation 10:

$$f : P = h_1 : d_1$$

$$d_1 = \frac{P \cdot h_1}{f}. \qquad (10)$$

By substituting d1 of the equation 10 for d1 of equation 9, the position of the mobile robot from the corrected landmark is expressed by the below equation 11:

$$P'(u_j v_j) = \frac{P \cdot h_1}{h_2}. \qquad (11)$$

The landmark position prediction part 140 is to calculate the position of a new landmark on the world coordinate when the new landmark is attached at the working zone. The world coordinate of the new landmark can be calculated by an application of the equations 1 and 5. $P_w$ in equations 1 and 5 is a real position expressed on the world coordinate of the mobile robot. To calculate $P_w$, it is assumed that Pi is a center of the image coordinate, when a new landmark appears on an image, an ID of the appearing new landmark is confirmed through the wireless receiving module 113, and an image coordinate of the new landmark is replaced by Pi to calculate the position of the mobile robot. By repeating the above procedures to calculate the position of the mobile robot, a real position of the new landmark can be calculated.

In other words, in the equation 12, the position Pi of the mobile robot on the image coordinate is replaced by an image coordinate of the new landmark to obtain a real position $P_w$ through a calculation, which becomes the real position (i.e., position on the world coordinate) of the new landmark. This relationship can be expressed by the following equation 13:

$$G_w = R_{we} \cdot s(R_{ie}(G_i - T_{ie})) + T_{we} \qquad (13),$$

where $R_{we}$ is a rotational vector informing how much the extra coordinate rotationally moves with respect to the world (absolute) coordinate, $R_{ie}$ is a rotational vector informing how much the image coordinate rotationally moves with respect to the extra coordinate, $T_{ie}$ is a parallel movement vector informing how much the image coordinate moves in parallel with respect to the extra coordinate, $T_{we}$ is a parallel movement vector informing how much the extra coordinate moves in parallel with respect to the world (absolute) coordinate, s is a distance ratio between two landmarks on an image and the real two landmarks, Gi is a position of the new landmark on the image coordinate, and Gw is a real position (i.e., position on the world coordinate) of the new landmark.

The topology map building part 150 which builds a topology map of the mobile robot using the position of the new landmark calculated by the landmark position prediction part 140 sets nodes so as to generate the topology map, and also needs a distance information between nodes.

In installing landmarks at a zone as shown in FIG. 6, the landmarks are used as the nodes of the topology map. In other words, when crossroads or a junction exists or a landmark is arbitrarily installed, the landmark itself is set as the node of the topology map. The distance information between the nodes is measured by the landmark position prediction part 140 which, when a new landmark is attached at the working zone, calculates the position of the new landmark on the absolute coordinate. The topology map building part 150 builds the topology map using the distance between the nodes obtained thus. Unlike the conventional topology map, the inventive topology map can easily set the nodes using the aforementioned method, and the distance information between the nodes can be automatically calculated by the method provided by the present invention without performing a real measurement.

The robot controller 160 controls the navigation of the mobile robot using the topology map built by the topology map building part 150.

Then, a localization method using the aforementioned localization system based on the camera and the landmarks according to the present invention will be described with reference to FIG. 7.

Figure 7:
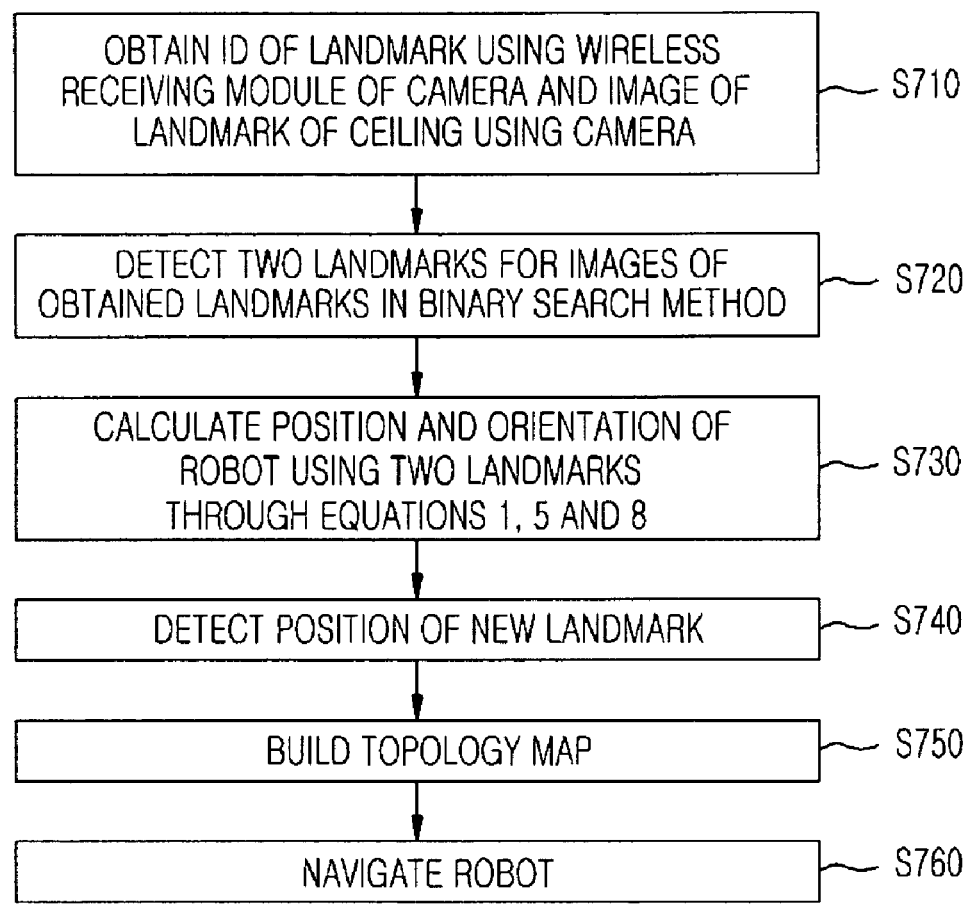
FIG. 7 is a flow chart illustrating a localization method of a mobile robot using a localization system of the mobile robot according to another embodiment of the present invention.

FIG. 7 is a flow chart illustrating a localization method of a mobile robot using the localization system of the mobile robot according to another embodiment of the present invention.

ID of the landmark 200 is received through the wireless receiving module 113 and an LED ON command is transmitted through the wireless transmitting module 112 to flash the landmark 200 attached at the ceiling within a specific wavelength band. Then, the landmark 200 is photographed through the camera provided with the infrared filter 111 (S710). From the photographed image, two landmarks are detected by a binary search method (S720).

The method of searching the two landmarks from the camera image by the binary search method is performed by repeating the steps of again transmitting LED ON signal to half irregularly selected from the landmarks which have received the LED ON signal to extract the desired landmarks, and transmitting LED ON signal to half of the half of the landmarks to extract the desired landmarks using the camera. Finally, two landmarks are detected by the landmark detection part 120.

Using the two landmarks obtained thus, the robot position detection part 130 obtains the position and orientation of the mobile robot (S730). The method of obtaining the position and orientation of the mobile robot may be changed depending on the state of the mobile robot. For example, when the robot is in a stop state, the final position of the robot is obtained using two landmarks through the equations 1 and 5, and the orientation of the mobile robot is obtained through the equation 8. When the mobile robot is in the mobile state, the position of the mobile robot is calculated by setting a mask with a constant size based on the image coordinates of the obtained two landmarks, and searching an area of the mask with the constant size set for the image coordinates of the landmarks after the moving of the mobile robot. This work can be repeated to calculate the position of the moving mobile robot in real time. Also, when the ceiling on which the landmarks are attached has different heights as shown in FIG. 4, the position of the robot is obtained by correcting the image coordinate of the landmark as shown in the equation 11.

When the position of the robot is obtained, the landmark position prediction part 140 calculates a position of a new landmark within the working zone (S740) and sets the new landmark as a node for generating a topology map and the topology map building part 150 builds a topology map (S750). The robot controller 160 controls the navigation of the mobile robot using the built topology map (S760).

As described above, compared with the conventional method, the localization system and method of the mobile robot based on a camera and landmarks according to the present invention can measure the position and orientation of the mobile robot more easily and conveniently, can automatically calculate the position of a newly added landmark without a real measurement, can limitlessly extend the working zone enabling the position measurement of the mobile robot using the newly installed landmarks, and can automatically calculate the distance information between nodes using newly installed landmarks as the nodes to automatically generate a topology map for the navigation of the mobile robot.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A localization system of a mobile robot, comprising:

n number of landmarks attached at a ceiling and having wireless transmitting and receiving functions, a camera photographing the n number of landmarks;

a landmark detection part which flashes the landmarks attached at the ceiling and obtains positions and IDs of the landmarks from an image photographed by the camera to detect at least two landmarks;

a robot position detection part calculating the position of the mobile robot using the detected landmarks, the robot position detection part comprising a first module calculating current position and orientation of the mobile robot using an image of the detected two landmarks when the mobile robot is in a stop state such that the first module calculates the current position 'Pw' of the mobile robot using the equation $P_w = R_{we} \cdot s(R_{ie} \cdot (P_i - T_{ie})) + T_{we}$, where $P_w$ is a real position of the mobile robot on a world coordinate that is the calculated final position of the mobile robot, $P_i$ is a position of the mobile robot on an image coordinate, $R_{we}$ is a rotational vector informing how much an extra coordinate rotationally moves with respect to the world coordinate, $R_{ie}$ is a rotational vector informing how much the image coordinate rotationally moves with respect to the extra coordinate, $T_{ie}$ is a parallel movement vector informing how much the image coordinate moves in parallel with respect to the extra coordinate, $T_{we}$ is a parallel movement vector informing how much the extra coordinate moves in parallel with respect to the world coordinate, and s is a distance ratio between the two landmarks on the image and the real two landmarks;

a landmark position prediction part which, when a new landmark is attached within a working zone, calculates a position of the new landmark on an absolute coordinate;

a topology map building part which builds a topology map of the mobile robot using the calculated position of the new landmark; and a robot controller controlling a navigation of the mobile robot using the built topology map.

2. The localization system of claim 1, wherein the n number of landmarks each have a specific ID built therein, comprises an infrared LED emitting light in a specific wavelength band, and wireless transmitting and receiving modules, and the camera comprises a camera filter which passes a light with the specific wavelength band to detect the infrared LED of the landmark.

3. The localization system of claim 2, wherein the LED of each of the n number of landmarks is flashed by each of the n number of landmarks and a wireless communication function of the camera.

4. The localization system of claim 1, wherein the landmark detection part detects at least two landmarks existing on an image of the camera by applying a binary search to the n number of landmarks attached at the ceiling.

5. The localization system of claim 1, wherein the robot position detection part further comprises:

a second module calculating a position of the mobile robot in real time when the mobile robot is in a moving state; and a third module calculating a position of the mobile robot when the ceiling to which the n number of landmarks are attached has different heights.

6. The localization system of claim 5, wherein the third module calculates the position of the mobile robot by correcting the image coordinates of the n number of landmarks in accordance to $$P'(u_j v_j) = \frac{P \cdot h_1}{h_2},$$

where P' is the position of the mobile robot obtained from the corrected image coordinates of the n number of landmarks, P is the position of the mobile robot obtained from the n number of landmarks before being corrected, and h1 and h2 are heights of the ceiling.

7. The localization system of claim 5, wherein the second module calculates the position of the mobile robot by setting a mask with a constant size based on the image coordinates of the obtained two landmarks, and searching only an area of the mask set for the image coordinates of the landmarks after the moving of the mobile robot.

8. A localization system of a mobile robot, comprising:

n number of landmarks attached at a ceiling and having wireless transmitting and receiving functions, a camera photographing the n number of landmarks;

a landmark detection part which flashes the landmarks attached at the ceiling and obtains positions and IDs of the landmarks from an image photographed by the camera to detect at least two landmarks;

a robot position detection part calculating the position of the mobile robot using the detected landmarks a landmark position prediction part which, when a new landmark is attached within a working zone, calculates a position of the new landmark on an absolute coordinate;

wherein when a new landmark is attached in the working zone, the landmark position prediction part identifies an ID of the new landmark, calculates a real position 'Pw' of the mobile robot on a world coordinate that is the calculated final position of the mobile robot in accordance to $$P_w = R_{we} \cdot s(R_{ie} \cdot (P_i - T_{ie})) + T_{we}$$

where $P_i$ is a position of the mobile robot on an image coordinate, $R_{we}$ is a rotational vector informing how much an extra coordinate rotationally moves with respect to the world coordinate, $R_{ie}$ is a rotational vector informing how much the image coordinate rotationally moves with respect to the extra coordinate, $T_{ie}$ is a parallel movement vector informing how much the image coordinate moves in parallel with respect to the extra coordinate, $T_{we}$ is a parallel movement vector informing how much the extra coordinate moves in parallel with respect to the world coordinate, s is a distance ratio between the two landmarks on the image and the real two landmarks, and calculates a real position Gw of the new landmark in accordance to $$G_w = R_{we} \cdot s(R_{ie} \cdot (G_i - T_{ie})) + T_{we} \text{ where}$$

Gi is a position of the new landmark on the image coordinate, and Gw is a real position of the new landmark;

a topology map building part which builds a topology map of the mobile robot using the calculated position of the new landmark; and a robot controller controlling a navigation of the mobile robot using the built topology map.

9. The localization system of claim 8, wherein the landmark detection part detects at least two landmarks existing on an image of the camera by applying a binary search to the n number of landmarks attached at the ceiling.

10. The localization system of claim 8, wherein the topology map building part builds the topology map by setting the landmarks as nodes and obtaining a distance information between the nodes.

11. The localization system of claim 8, wherein the n number of landmarks each have a specific ID built therein, comprises an infrared LED emitting light in a specific wavelength band, and wireless transmitting and receiving modules, and the camera comprises a camera filter which passes a light with the specific wavelength band to detect the infrared LED of the landmark.

12. The localization system of claim 11, wherein the LED of each of the n number of landmarks is flashed by each of the n number of landmarks and a wireless communication function of the camera.

13. The localization system of claim 8, wherein the robot position detection part comprises:

a first module calculating current position and orientation of the mobile robot using an image of the detected two landmarks when the mobile robot is in a stop state;

a second module calculating a position of the mobile robot in real time when the mobile robot is in a moving state; and a third module calculating a position of the mobile robot when the ceiling to which the n number of landmarks are attached has different heights.

14. The localization system of claim 13, wherein the second module calculates the position of the mobile robot by setting a mask with a constant size based on the image coordinates of the obtained two landmarks, and searching only an area of the mask set for the image coordinates of the landmarks after the moving of the mobile robot.

15. The localization system of claim 13, wherein the third module calculates the position of the mobile robot by correcting the image coordinates of the n number of landmarks in accordance to $$P'(u_j v_j) = \frac{P \cdot h_1}{h_2},$$

where
- P' is the position of the mobile robot obtained from the corrected image coordinates of the n number of landmarks,
- P is the position of the mobile robot obtained from the n number of landmarks before being corrected, and
- h1 and h2 are heights of the ceiling.

16. A localization method of a mobile robot using a camera and a landmark, the localization method comprising the steps of
- detecting the landmark from an image of the landmark photographed by the camera to calculate a position of a mobile robot, such that the detecting step comprises the steps of:
  - acquiring an ID of the landmark using a wireless transmitting and receiving module of the mobile robot, flashing the landmark and photographing an image of the landmark of a ceiling;
  - performing a binary search for the photographed image of the landmark to detect at least two landmarks; and
  - calculating position and orientation of the mobile robot using the detected at least two landmarks wherein
    - when the mobile robot is in a stop state, calculating a final position 'P$_w$' of the mobile robot using the detected at least two landmarks in accordance to $P_w = R_{we} \cdot s(R_{ie} \cdot (P_i - T_{ie})) + T_{we}$,

- when the mobile robot is in a moving state, calculating the position of the mobile robot by setting a mask with a predetermined size based on image coordinates of the at least two landmarks and searching an area of the mask set for the image coordinates of the landmarks after a moving of the mobile robot, wherein
    - P$_w$ is a real position of the mobile robot on a world coordinate that is the calculated final position of the mobile robot,
    - P$_i$ is a position of the mobile robot on an image coordinate,
    - R$_{we}$ is a rotational vector informing how much an extra coordinate rotationally moves with respect to the world coordinate,
    - s is a distance ratio between two landmarks on the image coordinate and on the world coordinate
    - R$_{ie}$ is a rotational vector informing how much the image coordinate rotationally moves with respect to the extra coordinate,
    - T$_{ie}$ is a parallel movement vector informing how much the image coordinate moves in parallel with respect to the extra coordinate,
    - T$_{we}$ is a parallel movement vector informing how much the extra coordinate moves in parallel with respect to the world coordinate, and
    - s is a distance ratio between the two landmarks on the image and the real two landmarks;
  - obtaining a position of the added landmark using the calculated position of the mobile robot when a new landmark is added to a working zone;
  - setting the added landmark as a node to build a topology map; and
  - controlling a navigation of the mobile robot using the built topology map and the calculated position of the mobile robot.

17. The localization method of claim 16, wherein in the acquiring step, the landmark comprises an infrared LED and the camera comprises an infrared filter which passes only a specific wavelength band, and the mobile robot flashes the infrared LED and then photographs the landmark.

18. The localization method of claim 16, wherein the step of calculating position and orientation of the mobile robot comprises, calculating the position of the mobile robot by correcting the image coordinates of the landmarks in accordance to $$P'(u_j v_j) = \frac{P \cdot h_1}{h_2},$$

when the ceiling to which the landmarks are attached has different heights, where
- P' is the position of the mobile robot obtained from the corrected image coordinates of the n number of landmarks,
- P is the position of the mobile robot obtained from the n number of landmarks before being corrected, and
- h1 and h2 are heights of the ceiling.

19. The localization method of claim 16, wherein the topography map is built by calculating a real position Gw of the new landmark in accordance to $G_w = R_{we} \cdot s(R_{ie}(G_i - T_{ie})) + T_{we}$ where Gi is a position of the new landmark on the image coordinate.

* * * * *